United States Patent [19]
Daumueller et al.

[11] Patent Number: 5,138,542
[45] Date of Patent: Aug. 11, 1992

[54] HEADLAMP FOR POWER VEHICLE

[75] Inventors: Hans Daumueller, Bodelshausen; Karl-Otto Dobler, Reutlingen; Heinz Ruckwied, Kusterdingen-Wankheim; Friedrich Schauwecker, Pfullingen, all of Fed. Rep. of Germany

[73] Assignee: Robert Bosch GmbH, Stuttgart, Fed. Rep. of Germany

[21] Appl. No.: 604,888

[22] Filed: Oct. 26, 1990

[30] Foreign Application Priority Data

Dec. 6, 1989 [DE] Fed. Rep. of Germany ....... 3940283

[51] Int. Cl.$^5$ .............................................. B60Q 1/04
[52] U.S. Cl. ...................................... 362/420; 362/66; 362/80; 362/428; 33/288
[58] Field of Search ............... 362/66, 418, 420, 428, 362/80; 33/288, 335

[56] References Cited

U.S. PATENT DOCUMENTS

| | | | |
|---|---|---|---|
| 4,660,128 | 4/1987 | Bergin et al. | 362/80 |
| 4,707,769 | 11/1987 | Van Duyn | 362/80 |
| 4,707,770 | 11/1987 | Van Duyn | 362/80 |
| 4,722,033 | 1/1988 | Van Duyn et al. | 362/80 |
| 4,802,067 | 1/1989 | Ryder et al. | 33/335 |
| 4,970,629 | 11/1990 | McMahan | 33/288 |
| 5,031,081 | 7/1991 | Daumueller et al. | 362/66 |

Primary Examiner—Ira S. Lazarus
Assistant Examiner—Y. Quach
Attorney, Agent, or Firm—Michael J. Striker

[57] ABSTRACT

A headlamp for a power vehicle having a chassis comprises a reflector mounted on the chassis and turnable in a horizontal direction for adjusting a direction of light bundle produced by the reflector, reference markings arranged on a chassis part for marking a predetermined position of the reflector, and markings showing a position of the reflector relative to the reference markings, the markings being provided on an upper side of the headlamp in its lateral end regions, the chassis part extending at least partially through the headlamp, and the chassis part having two openings through which the markings can be observed from a side of the headlamp respectively.

17 Claims, 4 Drawing Sheets

HEADLAMP FOR POWER VEHICLE

BACKGROUND OF THE INVENTION

The present invention relates to a headlamp for a power vehicle having a reflector mountable on a chassis and turnable in a horizontal direction for adjusting the direction of a light bundle produced from the reflector.

Headlamps of the above mentioned general type are known in the art. One of such reflectors is disclosed for example in the U.S. Pat. No. 3,612,854. This reflector is adjustably arranged in a receptacle of a power vehicle chassis. The power vehicle has a left and a right headlamp and a cable extending between both headlamps transversely to the longitudinal axis of the power vehicle or the like. Markings are arranged on each headlamp to orient them for correct adjustment of the headlamp in a predetermined manner relative to the cable. The headlamp adjustment by means of a cable is however not suitable for the practical use, since the cable is a hindrance on the chassis and its permanent tensioning is not guaranteed, for example due to material aging. Moreover, a correct adjustment of the headlamp is not insures when the headlamp is mounted in different positions relative to longitudinal axes of the power vehicle due to tolerances.

SUMMARY OF THE INVENTION

Accordingly, it is an object of the present invention to provide a headlamp which avoids the disadvantages of the prior art.

More particularly, it is an object of the present invention to provide a headlamp which can be reliably adjusted.

In keeping with these objects and with others which will become apparent hereinafter, one feature of the present invention resides, briefly stated, in a headlamp in which the markings are arranged on the upper side of the headlamp in its lateral end regions, the chassis part extends at least partially over the headlamp and is provided with two openings through which each of the markings can be observed from one side of the headlamp respectively.

When the headlamp is designed in accordance with the present invention,it eliminates the disadvantages of the prior art and achieves the above specified results.

In accordance with another feature of the present invention, the headlamp is formed as a housing headlamp provided with its own housing, its reflector is arranged on the housing, and at the side of fixing the reflector the marking is arranged on the housing, while at the displacement or adjustment side of the reflector another marking is arranged on the reflector or on a part following the adjusting movement of the reflector.

In accordance with still another feature of the present invention, the headlamp is formed as a headlamp unit, and its reflector is mounted on the chassis part and provided with the markings.

Still another feature of the present invention is that the part of the adjusting element for horizontal adjustment of the reflector is formed as a screw with a head extending outwardly of the housing, and the marking is formed by a peripheral edge of the screw head or the screw shaft.

A part can be formed as a indicator connectable with the reflector and having a portion which extends outwardly beyond the housing and provided with the markings.

The indicator can be screwed on the threaded portion of the adjustment element extending outwardly beyond the housing, or on a threaded portion of a part of the deviating transmission cooperating with the adjustment element.

With the above specified features, a simple transmission of the adjustment movement of the reflector to the housing is obtained.

In accordance with still a further feature of the present invention, the indicator is screwed on the threaded portion through a partitioned threaded sleeve which can be radially open after loosening of an arresting connection. In this way, the indicator can be mounted on the threaded portion in any position.

The marking can be provided at the adjustment side of the reflector, on the reflector and the housing in the region of the opening can be either transparent or provided with an observation window. In this case no transmission of the adjustment moment of the reflector from the housing is necessary.

Finally, a pendulum can be arranged on the reflector at its adjustment side for controlling the adjustment of the inclination of the reflector, and the pendulum arm can extend toward the opening and serve as the marking. Therefore, additional expenses are eliminated.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
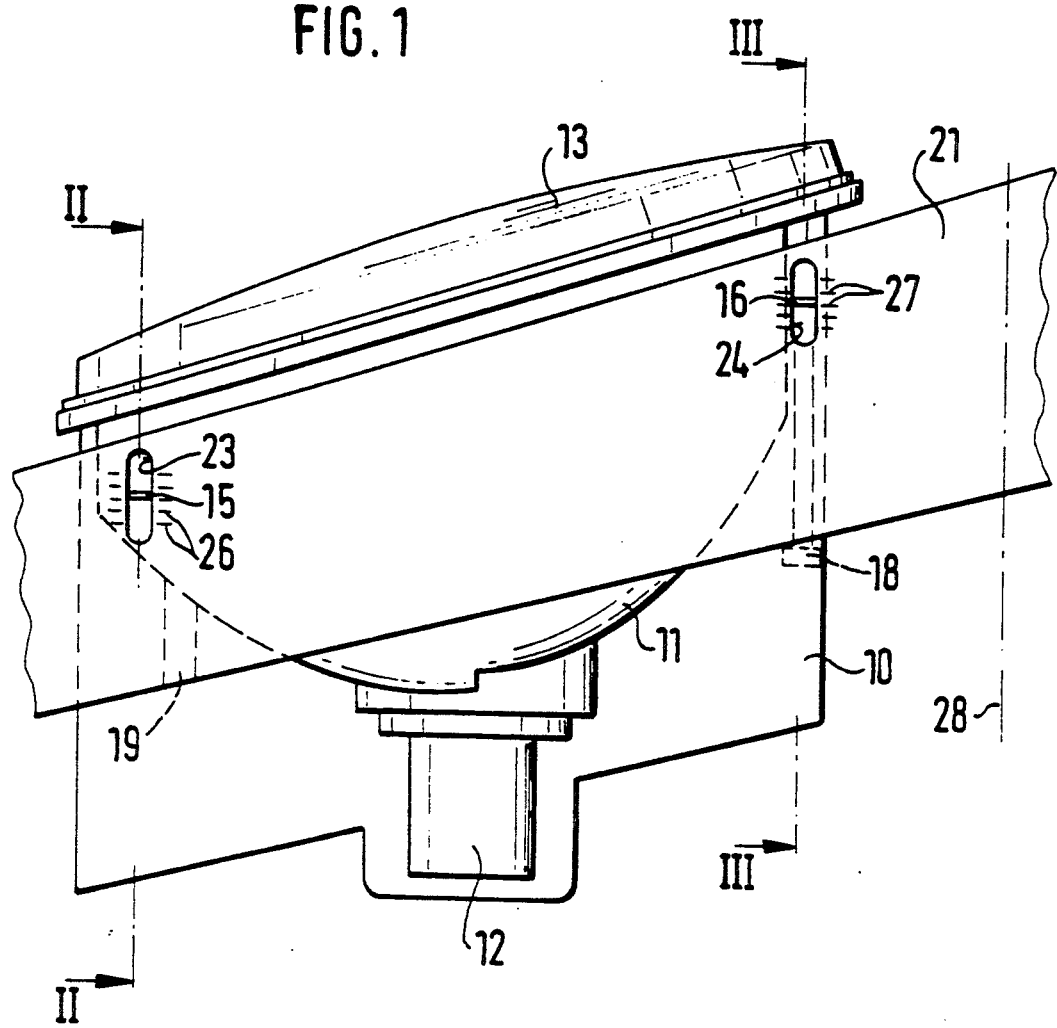
FIG. 1 is a plan view of a headlamp in accordance with a first embodiment of the present invention.
Figure 2:
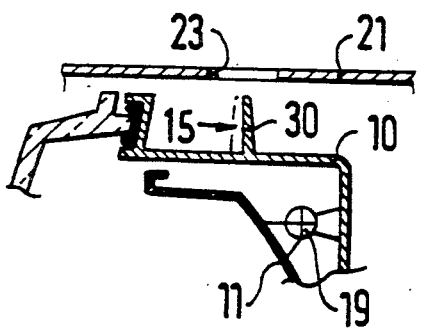
FIG. 2 is a view showing a section of the headlamp of FIG. 1 taken along the line II—II in FIG. 1.

A headlamp for power vehicle shown in FIG. 1 is mounted on a chassis of the power vehicle. The headlamp has a housing 10, in which a reflector 11 is arranged,and provided with an incandescent lamp 12. The front side panel of the housing is covered with a light disc 13. The headlamp has at its upper side as well in both lateral end regions markings which are identified as a whole with reference numerals 15 and 16 and can be formed as different elements, as will be described hereinbelow. The marking 15 is arranged on the housing 10, while the marking 16 is connected with the reflector 11. The reflector 11 is arranged displaceably in the housing 10 and is turnable by means of an adjusting screw 18 serving as an adjustment element about an abutment 19 arranged in the region of the marking 15. The arrangement from the position 15 to the position 16 can be mirror-symmetrical.

A transverse support 21 of the chassis covers the headlamp partially at its upper side and has, in the region of the markings 15 and 16, openings 23 and 24 through which the markings 15 and 16 can be observed. Laterally near the openings 23 and 24, line markings 26 and 27 are arranged on the transverse support 21 and form reference markings. They are used by producers of power vehicles to orient them in a predetermined position relative to the longitudinal axis 28 for each individual headlamp so that the horizontal direction of the light bundle produced by the headlamp is correctly adjusted when the markings 15 and 16 of the headlamp are in the same position relative to the reference markings 26 and 27.

The marking 15 is shaped as a rib 30 of the housing 10. However, it can be formed as a projection or another part. The marking 16 connected with the reflector 11 is arranged on the adjusting screw 18. The adjusting screw 18 is screwed through a threaded opening 32 in the rear side of the housing 10, and during turning performs a longitudinal movement corresponding to the adjusting movement of the reflector 11. A circular edge 33 on the head 34 extending from the housing 10 or on the shaft of the adjusting screw 18 serves as the marking 16. During mounting of the headlamp, the marking 15 at the abutment side assumes a position relative to the line marking 26 which is dependent on mass tolerances of the headlamp and the chassis. For correct adjustment of the direction of the light bundle produced by the reflector, the marking 16 is brought on the adjusting screw 18 by turning the same in the same position relative to the line marking 27 in which the marking 15 is located relative to the line marking 26.

Figure 3:
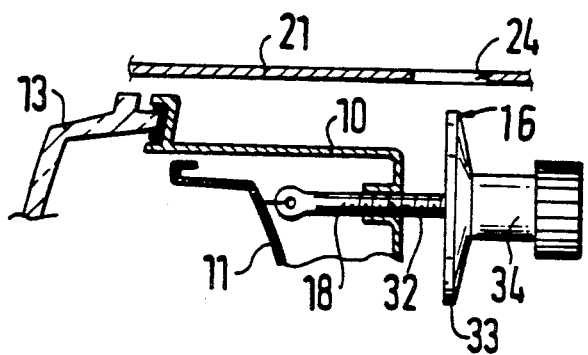
FIG. 3 is a view showing a section of the headlamp taken along the line III—III in FIG. 1.
Figure 4:
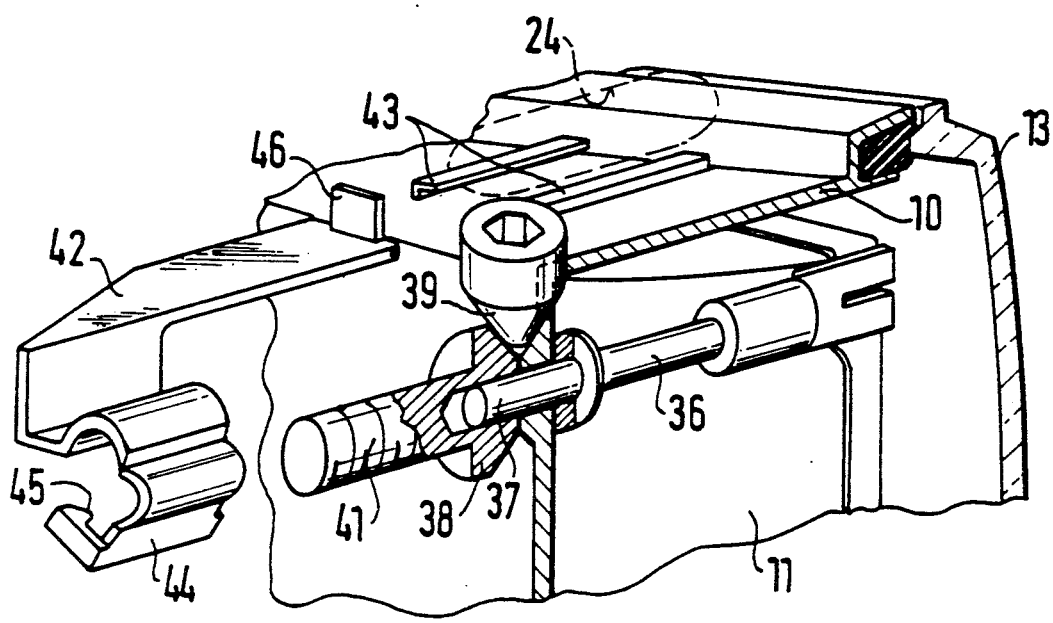
FIG. 4 is a partial variant of the headlamp of the embodiment of FIG. 3.

FIG. 4 shows a variant of FIG. 3, in which the adjusting screw 36 is pivotably connected to the reflector through a nut part, and held axially on the housing 10 to extend with its partial section 37 outwardly beyond the housing 10. A bevel gear 38 is mounted on the partial section 37 as a part of a deviating transmission. The bevel gear 38 is axially fixed and engages with a second bevel gear 39 extending perpendicularly to the first gear 38 relative to the upper surface of the housing 10. The bevel gear 38 has a threaded portion 41 which faces away of the housing 10 and has a indicator 42. The indicator 42 is guided on the upper side of the housing 10 in guiding grooves formed by two guiding strips 43. An arm 46 extends from the indicator 42 to the opening 24. The threaded portion 41 is provided with a thread having the same pitch as the threaded portion 37 of the adjusting screw 36. The indicator 42 has a partitioned threaded sleeve 44 which can be radially opened and held in closed condition by an arresting hook 45. The indicator 42 is movable in the case of the open sleeve 44 to any position on the threaded portion 41 and is clampable in this position. By the actuation of the second bevel gear 39 the adjusting screw 36 is turned through the first bevel gear 38 and, depending on the rotary direction, screws the reflector 11 from the first bevel gear 38 or with it. The indicator 42 is screwed in the same direction and over the same path on the threaded portion 41 to the bevel gear 38 or from it, so that the displacement of the reflector 11 is indicated by the arm 46 in the opening 24.

Figure 5:
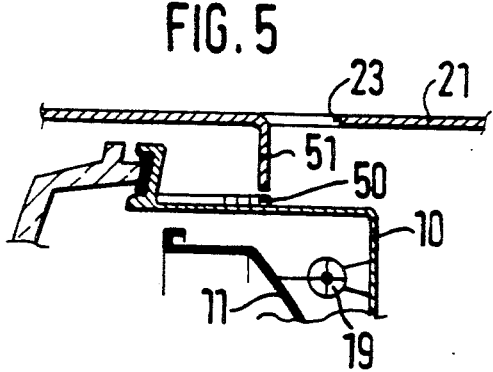
FIG. 5 is a headlamp in accordance with a second embodiment, in section, taken along the line corresponding to the line II—II in FIG. 1.
Figure 6:
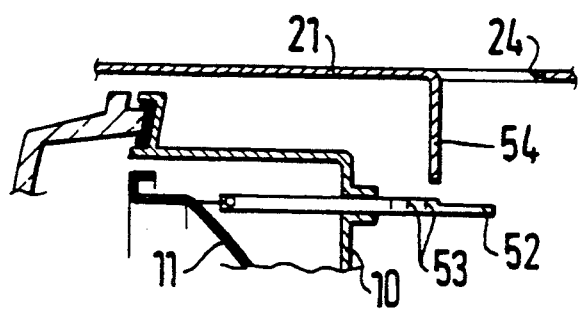
FIG. 6 is a view showing a second embodiment in section, taken along the line corresponding to the line III—III in FIG. 1.

In the second embodiment shown in FIGS. 5 and 6, the marking 15 in deviation from the first embodiment includes several line markings 50 on the upper side of the housing 10 at the side of the abutment of the headlamp. An arm 51 extends at the front edge of the opening 23 from the transverse support 21 to the line markings 50 to serve as reference marking. A indicator 52 is coupled with a reflector 11 at the displacement side of the headlamp. It extends outwardly of the housing 10 and follows the displacement movement of the reflector. Several line markings 53 forming the markings 16 are arranged on the portion of the indicator 52 extending outwardly of the housing 10. In correspondence with the first embodiment, the line markings 50 and 53 are provided on the headlamp in the same positions relative to the arms 51 and 54 for adjusting the headlamp.

Figure 7:
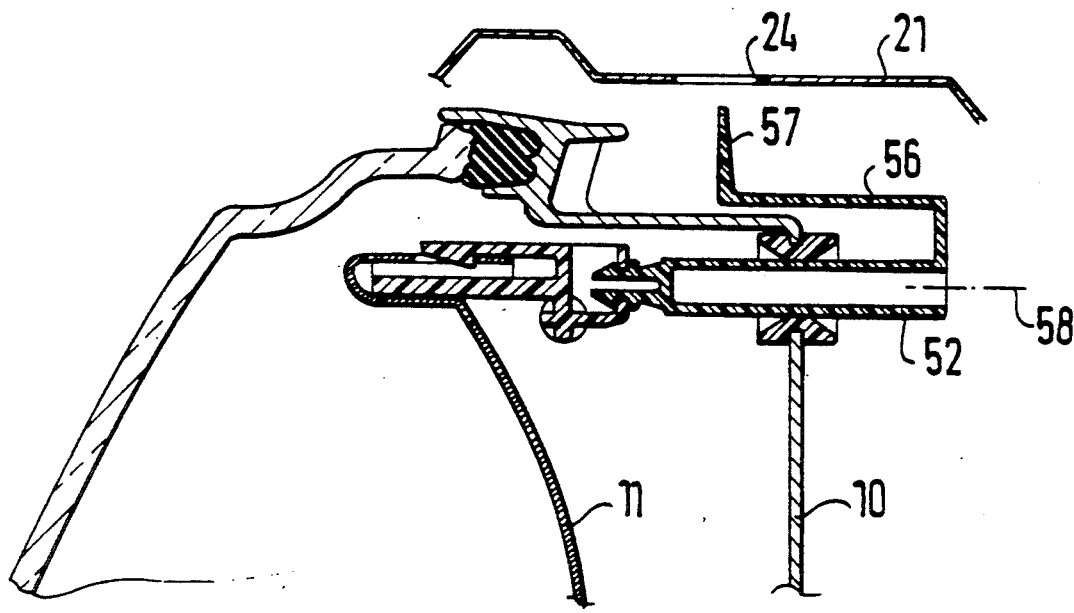
FIG. 7 is a view showing a variant of the headlamp of FIG. 6.

FIG. 7 shows a variant in which the indicator 52 is engaged in the reflector 11. The indicator 52 has a portion 56 which surrounds the housing 10 and provided at its end with an arm 57 extending to the opening 24 in the transverse support 21. The indicator 52 is turnable about its longitudinal axis 58 so that, for mounting of the headlamp, it can be turned away and with the mounted headlamp it is turned to its operational position in which the arm 57 shows upwardly. This is especially advantageous for transverse supports 21 which are formed U-shaped for reinforcing their cross-section.

Figure 8:
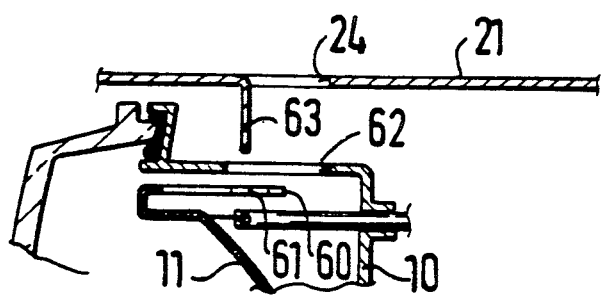
FIG. 8 is a view showing a variant of FIG. 6 in a section taken along the line III—III in FIG. 1.

In the variant shown in FIG. 8, a projection is formed on the reflector 11 on its upper edge at the displacement side of the headlamp. Several line markings 61 are arranged on the projection 60 to form the marking 16. The housing 10 is provided in the region of the projection 60 and in its upper side with an observation window 62 or made transparent. An arm 63 projecting to the observation window 62, forms the reference marking on the transverse support 21.

Figure 9:
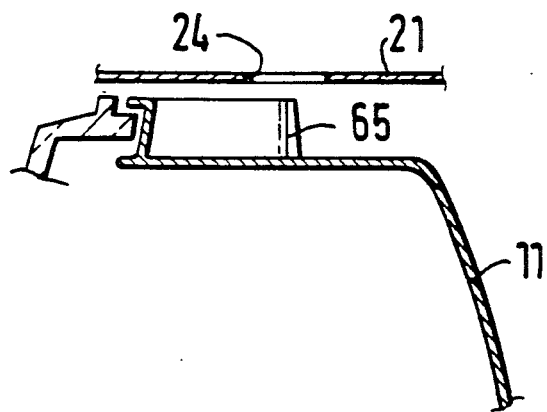
FIG. 9 is a view showing a third embodiment of the headlamp in accordance with the present invention in section taken along the line corresponding to the line III—III in FIG. 1.

FIG. 9 shows a third embodiment in which the headlamp is formed as a headlamp unit and in deviation from the first embodiment, has no housing. The reflector 11 of the headlamp is mounted on the chassis, for example, through a not shown supporting frame. Both markings 15 and 16 are provided on the upper side of the reflector 11 and formed as ribs 65. In correspondence to the first two embodiments, the markings can be formed as projections or protrusions or line markings, and the reference markings on the transverse support can be formed as line markings or arms projecting to the line markings on the reflector.

Figure 10:
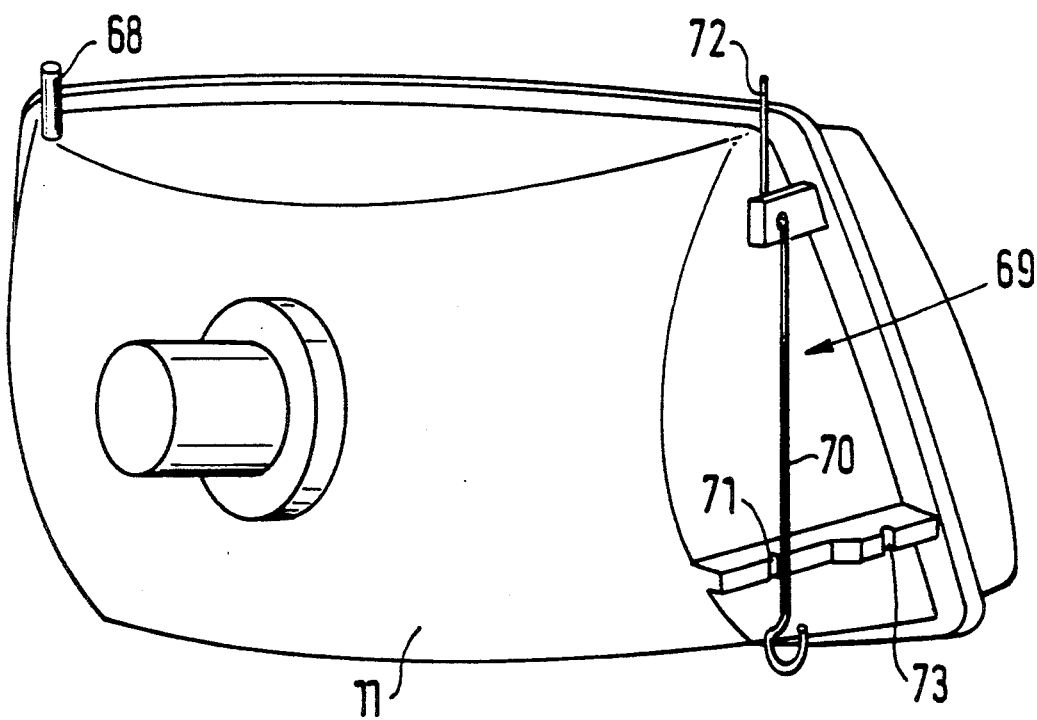
FIG. 10 is a view a fourth embodiment of the headlamp in perspective.

In the fourth embodiment shown in FIG. 10, the headlamp is also formed as a headlamp unit similar to that of the third embodiment. A pin 68 extends at the abutment side from the reflector 11 as the marking 15 into the opening 23. At the displacement side a pendulum 69 is supported laterally on the reflector 11. The pendulum 69 has a pendulum arm 70 and shows the inclination of the reflector 11 relative to the member 71 arranged on the reflector 11. A pendulum arm 72 extends from the pendulum 69 upwardly. It serves as a marking 16 and follows a displacement movement of the reflector 11. The pendulum arm 70 is clamped after adjustment of the headlamp, on a nut 73 on the reflector 11. The adjustment of the headlamp is performed similarly to the previous embodiments.

It will be understood that each of the elements described above, or two or more together, may also find a useful application in other types of constructions differing from the types described above.

While the invention has been illustrated and described as embodied in a hadlamp for power vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A headlamp for a power vehicle having a chassis, comprising a reflector mounted on said chassis and turnable in a horizontal direction for adjusting a direction of light bundle produced by said reflector; reference markings arranged on a chassis part for marking a predetermined position of said reflector; and markings showing a position of said reflector relative to the reference markings, said markings being provided on an upper side of the headlamp in its lateral end regions, said chassis part extending at least partially through the headlamp, and said chassis part having two openings through which said markings can be observed from a side of the headlamp,respectively.

2. A headlamp as defined in claim 1, wherein said reference markings are formed as line markings arranged laterally of said two openings.

3. A headlamp as defined in claim 1, wherein said reference markings are formed as arms projecting from an edge of said openings toward the headlamp, said markings being formed as line markings on the headlamp.

4. A headlamp as defined in claim 1, wherein the headlamp is formed as a headlamp unit,and said reflector is mounted on said chassis part, said markings being arranged on said reflector.

5. A headlamp as defined in claim 1; and further comprising a pendulum arranged on said reflector at its displacement side for controlling an adjusting of an inclination of said reflector; and a pendulum arm extending from said pendulum to said opening and forming said marking.

6. A headlamp as defined in claim 1; and further comprising a housing mounted on said chassis, said reflector being arranged on said housing, said markings including a marking arranged at a side of fixation of said housing and another marking arranged at a side of displacement of said reflector.

7. A headlamp as defined in claim 6, wherein said other mark is arranged on said reflector at said displacement side.

8. A headlamp as defined in claim 6, wherein said marking is formed at a displacement side of said reflector, and said housing is transparent in the region of said opening.

9. A headlamp as defined in claim 6, wherein said marking is formed at a displacement side of said reflector, and said housing is provided with an observation window in the region of said opening.

10. A headlamp as defined in claim 6, wherein the other mark is arranged on a structural part which follows a displacement movement of said reflector.

11. A headlamp as defined in claim 10, wherein said part is an adjusting element for a horizontal displacement of said reflector and formed as a screw with a head extending outwardly beyond said housing, said marking being formed as a peripheral edge of said screw.

12. A headlamp as defined in claim 11, wherein said screw has a screw head, said marking being formed at said peripheral edge of said screw head.

13. A headlamp as defined in claim 11, wherein said screw has a screw shaft, said marking being formed at said peripheral edge of said screw shaft.

14. A headlamp as defined in claim 6, wherein said part is formed as a indicator connected with said reflector and having a portion extending outwardly of said housing and provided with said marking.

15. A headlamp as defined in claim 14; and further comprising a displacing element for the reflector and having a threaded portion extending outwardly of the housing, said indicator being screwed on said threaded portion non-rotatably relative to the latter.

16. A headlamp as defined in claim 14; and further comprising a displacement element for displacing the reflector and a deviating transmission having a part cooperating with said displacing element, said part having a threaded portion, said indicator being screwed on said threaded portion non-rotatably relative to the latter.

17. A headlamp as defined in claim 14; and further comprising a partitioned threaded sleeve, said indicator being screwed on said threaded portion through said partitioned threaded sleeve, said threaded sleeve being readily open after releasing an arresting connection.

* * * * *